Patented Apr. 2, 1940

2,196,034

UNITED STATES PATENT OFFICE 2,196,034

HIGH MELTING POINT SOLDER

Richard Schulze, Berlin-Mariendorf, Germany, assignor to General Electric Company, a corporation of New York No Drawing. Application March 9, 1939, Serial No. 260,861. In Germany March 24, 1938

3 Claims. (Cl. 75—178)

The connection of aluminum parts, for instance shaped parts, by means of soldering, is of importance for many industries and consequently there have been many attempts to develop suitable soldering methods and suitable solders. However, special difficulties occur whenever aluminum parts that are not pure aluminum are to be soldered together or when heat-treated aluminum alloys are to be connected. Since the latter are quite sensitive to the influence of heat it is necessary to limit as narrowly as possible the soldering portion that is to be heated in the soldering operation. In order to attain this, protecting sleeves heretofore have been employed.

The type of the solder utilized is of importance with respect to the quality of the soldered connection. According to the present invention, a solder is employed which consists of 60–70 per cent zinc and 40–30 per cent aluminum. If desired however a portion of the zinc or aluminum or both may be replaced with up to about 5 per cent silicon. Such compositions have proved particularly suitable for the connection of parts of aluminum alloys (for instance of the Al-Cu-Mg type). A solder consisting of about 65 per cent zinc, about 30 per cent aluminum and about 5 per cent silicon provides very satisfactory results. Any of the fluxes on the market can be used. However, among these, the non-hygroscopic ones are particularly desirable. The hard solder according to the present invention melts at approximately 500° C. The high melting temperature gives assurance of a good alloying of the basic metal and the solder. For instance it has been possible to make with my improved solder perfect hard soldered joints of Avional pipes inserted in fittings.

What I claim as new and desire to secure by Letters Patent of the United States, is:

1. A hard aluminum solder consisting of 55 to 70 per cent zinc, 25 to 40 per cent aluminum and an effective quantity up to 5 per cent silicon, said solder having a melting point of about 500° C.

2. A solder adapted for soldering aluminum alloys, said solder consisting of zinc, aluminum and silicon, the zinc comprising at least 60 per cent but not more than 70 per cent of said alloy, the aluminum at least 30 but not more than 40 per cent and the silicon up to 5 per cent.

3. A hard aluminum solder containing about 65 per cent zinc, about 30 per cent aluminum, and about 5 per cent silicon.

RICHARD SCHULZE.